US 6,671,764 B2

(12) United States Patent
Martin

(10) Patent No.: US 6,671,764 B2
(45) Date of Patent: Dec. 30, 2003

(54) PC ADAPTER CARD WITH AN INTERCHANGEABLE CONNECTOR SET

(75) Inventor: Michael H. Martin, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 471 days.

(21) Appl. No.: 09/741,987

(22) Filed: Dec. 20, 2000

(65) Prior Publication Data

US 2002/0078288 A1 Jun. 20, 2002

(51) Int. Cl.[7] .................. G06F 13/00; G06F 13/12; H01R 25/00
(52) U.S. Cl. .................. 710/301; 710/64; 710/72; 439/638
(58) Field of Search .................. 710/100, 300–304, 710/104, 105, 8–19, 62–74; 439/638–655

(56) References Cited

U.S. PATENT DOCUMENTS

| | | | | |
|---|---|---|---|---|
| 3,846,763 A | * | 11/1974 | Riikonen | 710/70 |
| 4,608,631 A | * | 8/1986 | Stiffler et al. | 710/113 |
| 4,751,634 A | * | 6/1988 | Burrus et al. | 710/63 |
| 5,457,601 A | * | 10/1995 | Georgopulos et al. | 361/686 |
| 5,528,758 A | * | 6/1996 | Yeh | 710/1 |
| 5,611,057 A | * | 3/1997 | Pecone et al. | 710/301 |
| 5,689,732 A | * | 11/1997 | Kondo | 710/64 |
| 5,727,184 A | * | 3/1998 | Richter et al. | 710/62 |
| 5,773,332 A | * | 6/1998 | Glad | 439/344 |
| 5,818,029 A | * | 10/1998 | Thomson | 235/486 |
| 5,819,050 A | * | 10/1998 | Boehling et al. | 710/104 |
| 5,828,905 A | * | 10/1998 | Rao | 710/63 |
| 5,928,347 A | * | 7/1999 | Jones | 710/305 |
| 5,964,852 A | * | 10/1999 | Overton | 710/62 |
| 5,984,731 A | * | 11/1999 | Laity | 439/676 |
| 6,058,441 A | * | 5/2000 | Shu | 710/100 |
| 6,217,351 B1 | * | 4/2001 | Fung et al. | 439/131 |
| 6,217,391 B1 | * | 4/2001 | Colantuono et al. | 439/676 |
| 6,325,674 B1 | * | 12/2001 | Oliphant et al. | 439/676 |
| 6,434,644 B1 | * | 8/2002 | Young et al. | 710/63 |
| 6,558,201 B1 | * | 5/2003 | Begley et al. | 439/638 |
| 2002/0059492 A1 | * | 5/2002 | Sabotta et al. | 710/301 |

* cited by examiner

Primary Examiner—Sumati Lefkowitz
(74) Attorney, Agent, or Firm—Fish & Richardson P.C.

(57) ABSTRACT

A PC adapter card system is disclosed. The system includes a connector set and a base unit. The connector set has a plurality of connection ports. The connector set sends/receives data to/from network resources through a communication device. The connector set is adapted to convert the data into a compatible format, such that the connection ports are compatible for connection with the communication device of a particular locality. The base unit interfaces data between the connector set and a computer. The base unit sends/receives data from said connector set in a standard format by selecting a compatible connector set for the particular locality.

11 Claims, 3 Drawing Sheets

PC ADAPTER CARD WITH AN INTERCHANGEABLE CONNECTOR SET

BACKGROUND

This invention relates to a PC adapter card, and more particularly to an interchangeable connector set allowing interlinking of the PC with a communication device using such an adapter card.

Mobile personal computer (PC) adapter cards, such as the Personal Computer Memory Card International Association (PCMCIA) card, have been used to interlink or network a mobile PC with a communication device. For example, PCMCIA standard specifies dimensions of about 2.1 inches× 3.4 inches, and a thickness of 3.5, 5, or 8 mm. The communication device may include a telephone, facsimile machine, or a modem. Other mobile PC adapter cards have been used to connect the mobile PC with cellular phones or local area network (LAN) lines. However when traveling, these mobile PC adapter cards may be relatively bulky. For example, different countries often require different types of connections for telephone, LAN, and cellular phone lines. Therefore, international travelers may have to carry several PC adapter cards for network connection.

DESCRIPTION OF DRAWINGS

These and other features and advantages of the invention will become more apparent upon reading the following detailed description and upon reference to the accompanying drawings.

DETAILED DESCRIPTION

In recognition of the above-described difficulties, the present disclosure describes a personal computer (PC) adapter card system having a base and an interchangeable connector set. The interchangeability of the connector set allows the base to remain connected to the PC. Only the connector set needs to be detached and replaced with an appropriate connector set for a particular locality. The connector set may be relatively small and light compared to the adapter card base. Further, the connector set may include at least one processor and a memory to convert data signal going/coming to/from a communication device to a proper format for communication with the PC.

Figure 1:
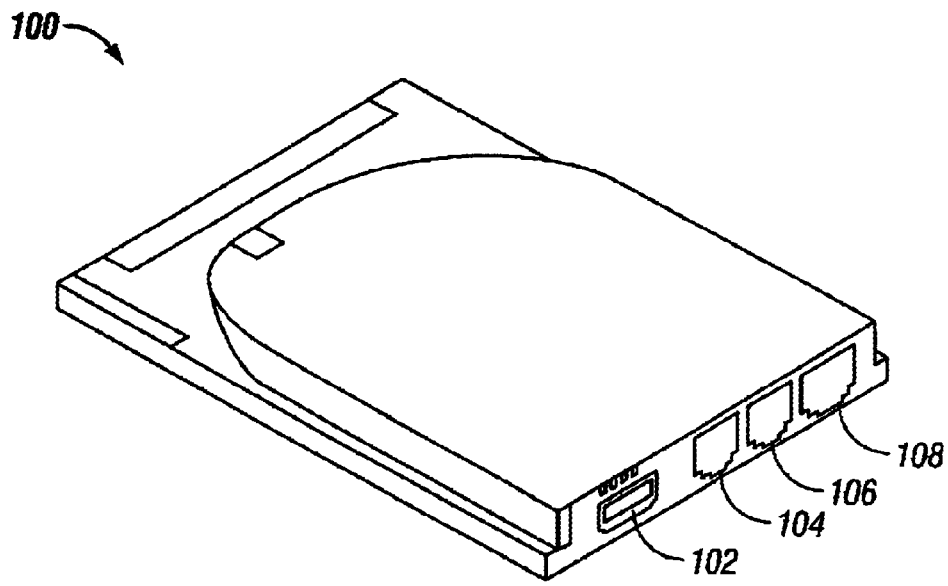
FIG. 1 illustrates a front perspective view of a conventional mobile PC adapter card.

FIG. 1 illustrates one example of a conventional mobile PC adapter card 100. The PC card 100 includes connection ports for a cellular phone 102, telephone 104, LAN 106, and other communication devices 108. However, the format of these connection ports 102, 104, 106, 108 may differ from country to country. For example, in a particular country, a telephone jack may not fit into the connection port 104. Or, even if the telephone jack does fit, the link may not operate properly because the interface protocol is different. In this case, a different PC card would be needed that may properly interface the telephone jack with the PC.

Figure 2A:
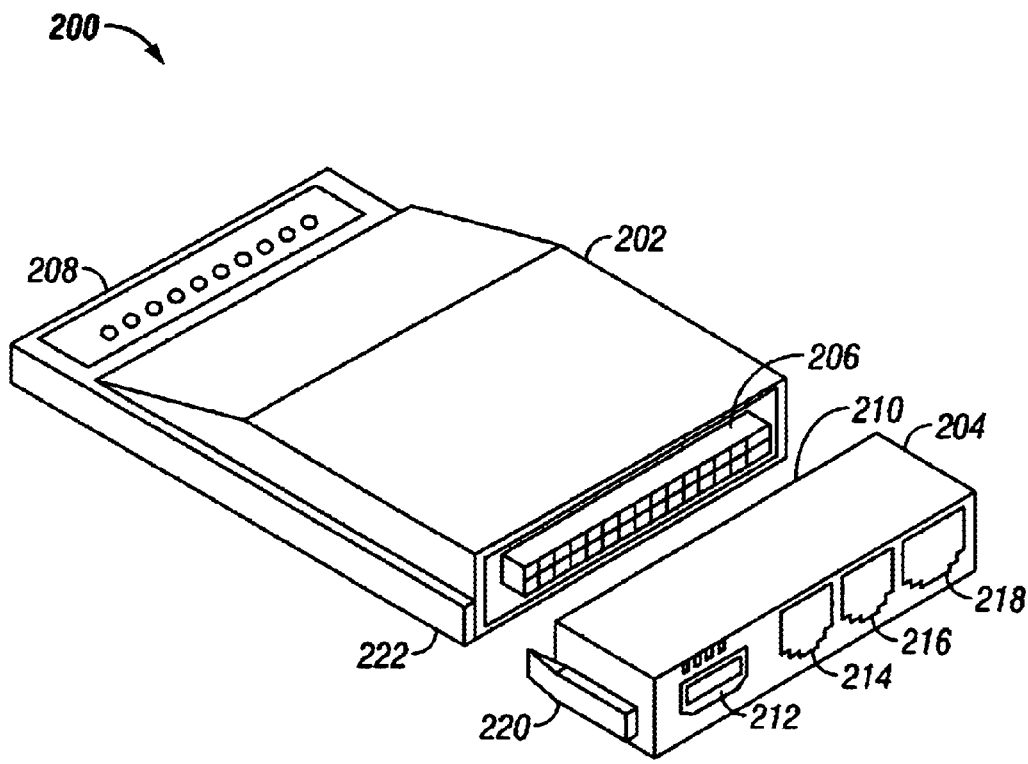
FIG. 2A shows an improved PC adapter card system according to an embodiment of the present disclosure.

An improved PC adapter card system 200 is illustrated in FIG. 2A according to an embodiment of the present disclosure. In the illustrated embodiment, the PC adapter card system 200 includes two separate modules: a base unit 202 and a connector set 204. The PC adapter card system 200 provides network interface to the PC. The network interface allows the PC to access e-mail, the Internet, and other network resources.

Figure 2B:
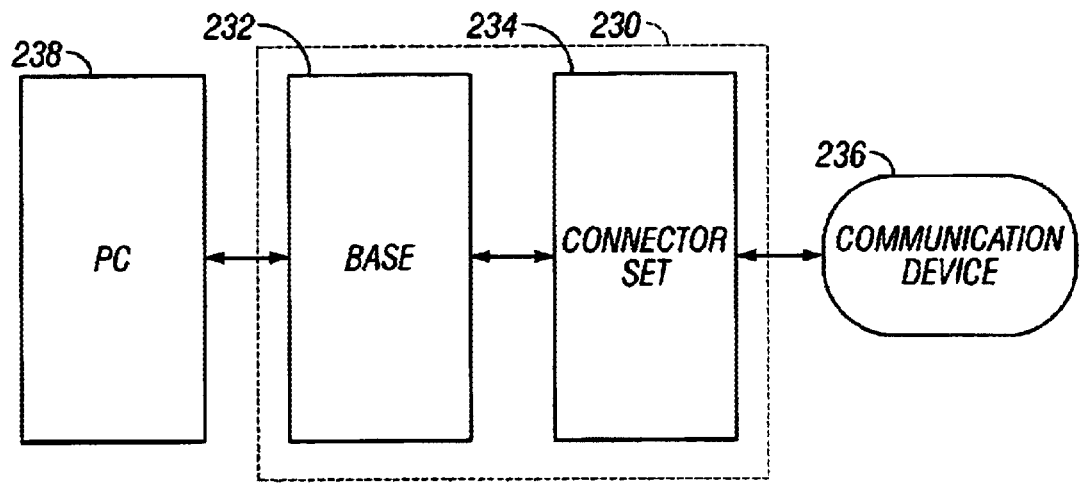
FIG. 2B is a block diagram of a network communication system in accordance with an embodiment of the present disclosure.

According to an embodiment of a network communication system shown in FIG. 2B, the PC adapter card system 230 may provide an interface connection between the PC 238 and the network resources through a communication device 236. The card system 230 includes a base 232 and a connector set 234.

In FIG. 2A, the base unit 202 interfaces data coming from a network resource, such as a communication device, with a PC. The base unit 202 interfaces with a network resource through a first connector port 206. This first connector port 206 connects to one side of the connector set 204. The first connector port 206 may be in a male or female configuration. The first connector port 206 receives converted data from the connector set 204 in a standard format. Therefore, the base unit 202 may be used universally. The base unit 202 may also include a second connector port 208, which fits flush with the side of the PC. The second connector port 208 provides the PC with access to the network resources.

The connector set 204 includes a matching connector port 210 that connects to the first connector port 206 of the base unit 202. This matching connector port 210 allows for transfer of data between the base unit 202 and the connector set 204. The connector set 204 also includes connection ports 212–218 that are similar to the connection ports 102–108 shown in FIG. 1. The ports 212–218 may include port connections for cellular phone, telephone, modem, LAN line, and other communication devices. The connector set 204 may further include a snap-on latch 220 that firmly holds the base unit 202 and the connector set 204 together.

Figure 2C:
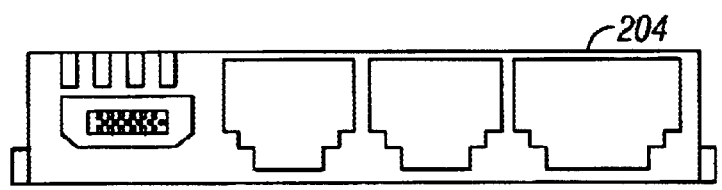
FIG. 2C illustrates one embodiment of a connector set.
Figure 2D:
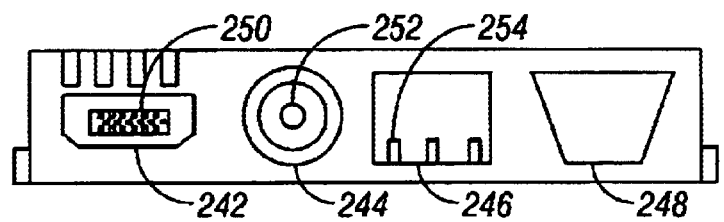
FIG. 2D illustrates another embodiment of a connector set.

A front view of the connector set 204 according to an embodiment of the present disclosure is shown in FIG. 2C. However, the connector set 204 may have a different configuration layout depending on the need at different locality. FIG. 2D shows an alternative configuration of the connector set 240. In this configuration, the connector 240 is configured to match the connection ports of the communication devices used in localities different from that used for communication devices connected to connector set 204. Thus, the connection ports 242, 244, 246, 248 may be configured or shaped differently. Further, even if the connection ports 242, 244, 246, 248 are shaped same as those 212–218 shown in FIG. 2A, the pins or holes 250, 252, 254 in the connection ports 242, 244, 246, 248 may be configured differently. Therefore, the PC adapter card system 200 includes a data converter that converts data to/from a communication device into a standard format output.

The converter may reside in the base unit 202 or the connector set 204/240. However, it is preferred that the converter reside in the connector set 204/240 so that the converter may be designed uniquely according to the configuration of the connector set 204/240. The output data format must be compatible with the standard format expected at the first connector port 206 of the base unit 202.

Figure 3:
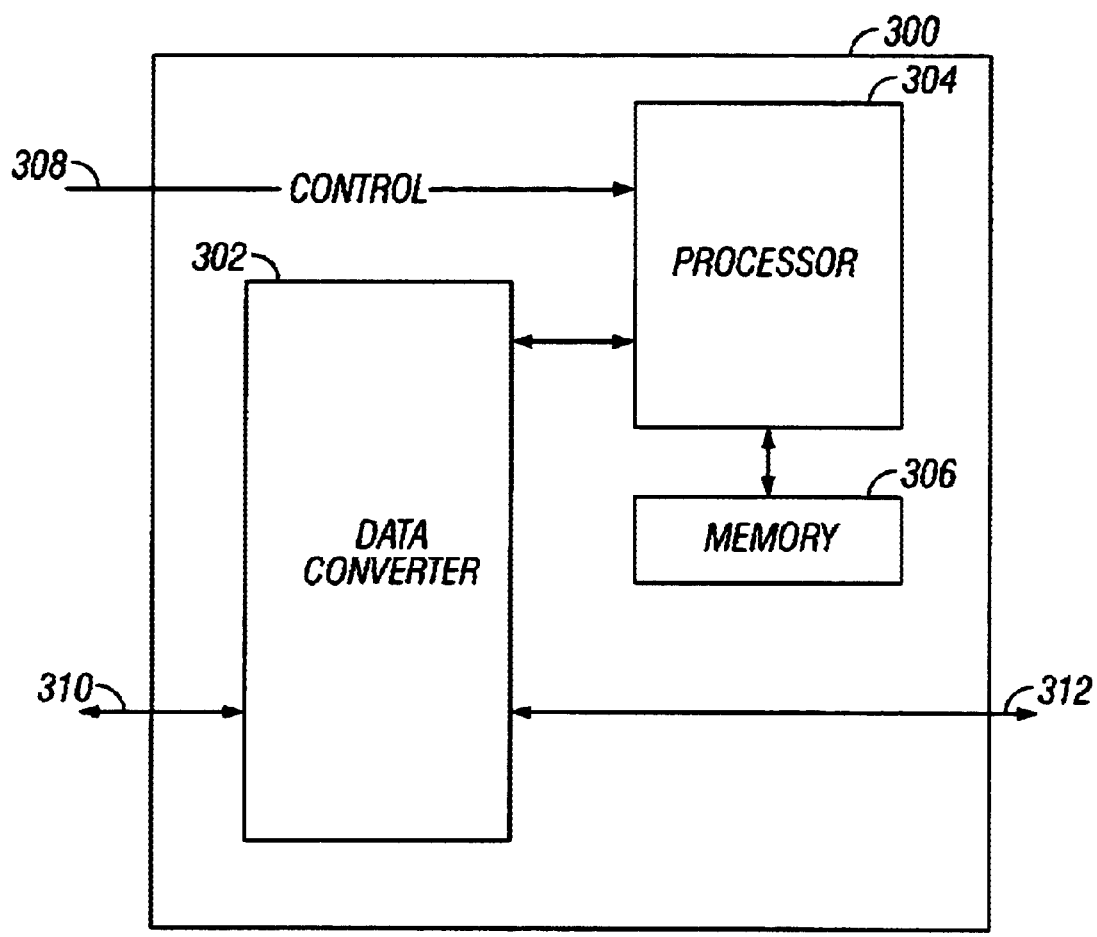
FIG. 3 is a block diagram of the connector set including a data converter according to an embodiment.

FIG. 3 is a block diagram of a connector set 300 including such a data converter 302 according to an embodiment. The connector set 300 may also include at least one processor 304 and a memory 306. In one embodiment, the processor 304 may receive a control signal 308 that indicates how the connector set 300 is configured. The processor 304 may direct the data converter 302 to transform the data 310 to/from a communication device into a proper format for a connection 312 to the base unit 202. The output data format should conform to the standard format expected at the first connector port 206 of the base unit 202.

In an alternative embodiment, information about the connector set 300 type that is supplied by the control signal 308 may be programmed into the memory 306. In this embodiment, a pin for the control signal 308 may be eliminated. Thus, a different connector set 300 type has a different code programmed into the memory 306, and the processor 304 configures the output data 312 differently.

While specific embodiments of the invention have been illustrated and described, other embodiments and variations are possible. For example, although the illustrated embodiment shows only a limited number of connection port configurations, other configurations are envisioned to provide connection to other communication devices.

All these are intended to be encompassed by the following claims.

What is claimed is:

1. An adapter card system for a personal computer, comprising:

a first portion, adapted to connect to the personal computer, and including circuitry which communicates with the personal computer and communicates to perform a specified operation with the first computer, said first portion having a first connector thereon;

a second portion, having a second connector which mates with the first connector, and having a third connector to connect to a specified communication device for a specified locality, and said second portion having electronics therein which modifies a signal from the first portion for communication ever the third connector; and a third portion, having said second connector which mates with the first connector, and also having a fourth connector which contacts a specified communication device for a different locality than said specified locality, said third portion having electronics therein which modifies a signal from the first portion for communication over the fourth connector.

2. A system as in claim 1, wherein said electronics in each of said second and third portion includes a data converter, each data converter converting data into a different format.

3. A system as in claim 2, wherein each of said second and third portion includes a processor which carries out said conversion.

4. A system as in claim 3, wherein each of said second and third portion includes a memory, which operates with said processor and holds processor instructions, said memory also including a selection code which selects a routine to convert the data into said format.

5. A system as in claim 3, wherein each of said second and third portions include a control signal receiving element that receives a control signal which indicates information about the compatible format.

6. A system as in claim 1, wherein said first portion is sized to fit into a PCMCIA slot.

7. A system as in claim 1, wherein said first portion defines an outer perimeter of a substantially rectangular shape, sized to fit into a PCMCIA slot, and wherein each of said second arid third portions defining outer perimeters of substantially the same size as said substantially rectangular shape.

8. A system as in claim 1, wherein said first portion circuitry includes a modem.

9. A system as in claim 1, wherein said circuitry of said first portion includes a cellular phone.

10. A system as in claim 1, wherein said circuitry of said first portion includes a network device.

11. A system as in claim 1, wherein each of said second and third portions include a processor which is responsive to a control signal to carry out a data conversion.

* * * * *